United States Patent [19]
Reuter et al.

[11] Patent Number: 6,000,679
[45] Date of Patent: Dec. 14, 1999

[54] SOLENOID COIL ATTACHMENT MECHANISM

[75] Inventors: David Fredrick Reuter, Beavercreek, Ohio; Jerry Lee Newton, Richmond, Ind.; Jay P. Johnson, Dayton, Ohio; Rodney A. Lawrence, Rossville; Jeffrey H. Burns, Kokomo, both of Ind.; Alejandro Moreno, El Paso, Tex.; Raymundo Saenz, Miamisburg, Ohio; Richard Michael Parrott, Fishers, Ind.

[73] Assignees: General Motors Corporation, Detroit, Mich.; Delco Electronics Corp., Kokomo, Ind.

[21] Appl. No.: 08/988,561

[22] Filed: Dec. 11, 1997

[51] Int. Cl.⁶ ............................ F15B 13/08; F16K 31/06
[52] U.S. Cl. ................ 251/129.15; 137/884; 303/119.2
[58] Field of Search ...................... 251/129.15; 137/884; 303/119.2, 119.3

[56] References Cited

U.S. PATENT DOCUMENTS

| | | | |
|---|---|---|---|
| 3,549,119 | 12/1970 | Sellers | 251/129.15 |
| 4,540,154 | 9/1985 | Kolchinsky | 251/129.15 |
| 4,651,971 | 3/1987 | Donahue, Jr. | 251/129.15 |
| 5,127,440 | 7/1992 | Maas et al. | 137/884 |
| 5,137,455 | 8/1992 | Moerbe et al. | 439/34 |
| 5,145,149 | 9/1992 | Moehle | 251/129.15 |
| 5,152,322 | 10/1992 | Maas et al. | 137/884 |
| 5,218,999 | 6/1993 | Tanimoto | 251/129.15 |
| 5,333,836 | 8/1994 | Fukuyo et al. | 251/129.15 |
| 5,364,067 | 11/1994 | Linkner, Jr. et al. | 251/129.15 |
| 5,374,114 | 12/1994 | Burgdorf et al. | 303/119.2 |
| 5,439,279 | 8/1995 | Linker, Jr. et al. | 251/129.15 |
| 5,449,019 | 9/1995 | Hara | 137/884 |
| 5,452,948 | 9/1995 | Cooper et al. | 303/119.2 |
| 5,460,350 | 10/1995 | Nagashima et al. | 251/129.15 |
| 5,462,344 | 10/1995 | Jakob et al. | 303/119.2 |
| 5,520,447 | 5/1996 | Burgdorf et al. | 303/119.2 |
| 5,605,386 | 2/1997 | Ziegler et al. | 251/129.02 |
| 5,653,249 | 8/1997 | Reinartz et al. | 251/129.15 |
| 5,681,099 | 10/1997 | Steffes et al. | 303/119.2 |
| 5,823,507 | 10/1998 | Inden et al. | 251/129.15 |
| 5,845,672 | 12/1998 | Reuter et al. | 137/315 |

*Primary Examiner*—Kevin P. Shaver
*Assistant Examiner*—Eric Keasel
*Attorney, Agent, or Firm*—Robert M. Sigler

[57] ABSTRACT

A solenoid coil attachment mechanism includes a coil assembly with a wire end that projects from the coil assembly and an extending elongated leg that includes a latching mechanism. A carrier has a wall with an opening receiving the leg of the coil assembly and has a wire guide that is funnel shaped, has an open end and receives the end of the wire. A circuit board is attached to the carrier and the wire end is soldered directly to the circuit board.

20 Claims, 5 Drawing Sheets

SOLENOID COIL ATTACHMENT MECHANISM

TECHNICAL FIELD

The present invention relates to a solenoid coil attachment mechanism and more particularly, to a mechanism for attaching control devices to the solenoid coils that are used with a hydraulic modulator for onboard vehicle system controls.

BACKGROUND OF THE INVENTION

Present state-of-the-art hydraulic modulator and electronic control unit (ECU) assemblies typically used in on-board vehicle control of braking and intelligent chassis control systems are known to include integrated solenoid valves. These valves are a key component in providing the necessary level of hydraulic control that serves the function of directing fluid flow to the brake and/or suspension systems. The hydraulic controls enable outputs from the ECU to change vehicle operating parameters. Exemplary systems include anti-lock braking systems (ABS), traction control systems (TCS) and intelligent ride control systems (ICS) that operate through the vehicles chassis systems. One of the latest designs on the market utilizes solenoid valves with sealed hydraulic valve bodies and separately removable solenoid coil assemblies. This system is disclosed in U.S. Pat. No. 5,845,672, which is commonly assigned.

Numerous other design variations of these types of valve and coil assemblies have been created in attempts to minimize cost, minimize package size, and maximize design for manufacture. Previous designs have included coil terminals that are individually welded to lead frames with built in compliance to provide the coil with sufficient "float" to take up manufacturing tolerances. Other designs use rigid terminals that are wave-soldered directly to a standard circuit board and the coil case is allowed to float. Still other designs have coil wires that are directly wave soldered to a circuit board and are supported by a plastic housing to limit travel and float. The goal in all cases is to minimize stresses on the connection between the solenoid coils and the circuit board. Since the operating environment is onboard a vehicle, vibratory inputs are commonly encountered. A complicating factor in designing the solenoid/control board interface is that the assembly of the unit tends to become more difficult as features are added to address the goal of limiting stresses on the connection. Accordingly, a need continues to exist for a solenoid coil attachment mechanism that is easily assembled while protecting the assembly from vibratory inputs while in service.

SUMMARY OF THE INVENTION

A goal of the present invention resides in addressing the concurrent needs for simplified assembly and robust service in a solenoid coil attachment mechanism through the concept of a "coil pack" assembly. A separate carrier is employed, and the solenoid coils are pre-attached to the carrier before assembly to the control system. This design avoids expensive insert molding techniques. The arrangement also advantageously permits the coil pack to be installed in one relatively simple operation on the main circuit board assembly line, which can greatly simplify the design and cost of the final system assembly operation.

A solenoid coil attachment mechanism according to the invention includes a coil assembly with a wire end that projects from the coil assembly and an extending elongated leg that includes a latching mechanism. A carrier has a wall with an opening receiving the leg of the coil assembly and has a wire guide that is funnel shaped and that receives and guides the end of the wire. Preferably, a circuit board is attached to the carrier and the coil wire end is soldered directly to the circuit board.

BRIEF DESCRIPTION OF THE DRAWINGS

The present invention will now be described by way of example, with reference to the accompanying drawings, in which.

DESCRIPTION OF THE PREFERRED EMBODIMENT

Figure 1:
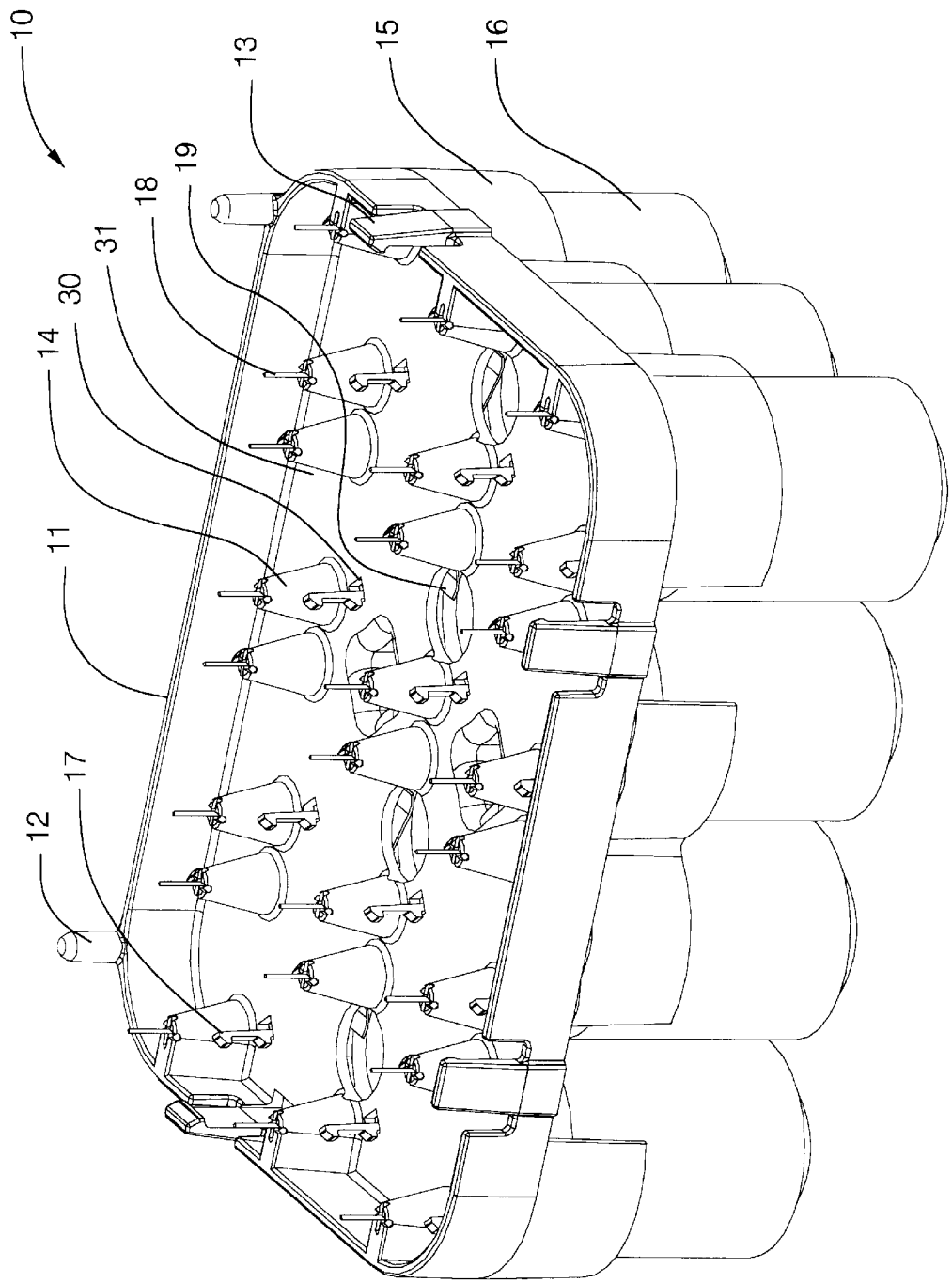
FIG. 1 is a perspective illustration of a coil pack assembly according to the present invention.

Referring to the drawings, illustrated in FIG. 1 is a coil pack assembly 10 as used in the presently preferred embodiment of the invention. The plastic carrier 11 provides a housing for twelve individual solenoid coils although the number of coils will vary according to the application. The individual coil assemblies 16 snap into one of two initial positions by pushing the latches 17 through rectangular holes 30 that are formed in the surface 31 of the carrier 11. Each coil assembly 16 includes two latches 17 and comprises a plurality of turns of wire wound on a bobbin. The latches 17 each comprise a flexing elongated leg that extends from the coil assemblies 16. The latches 17 are shown in a secondary initial position in FIG. 1 for clarity, but would normally be in a shipping position for the assembly of coil pack 10 prior to engagement with the assembled control circuit board.

Figure 2A:
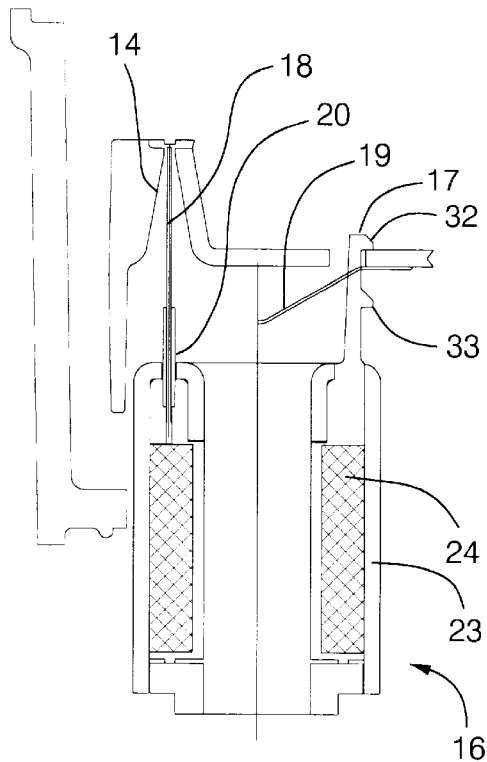
FIG. 2A is a schematic fragmentary cross sectional illustration of a single solenoid coil of the coil pack assembly of FIG. 1 shown in a shipping position.

Referring to FIG. 2A along with FIG. 1, the initial snap position of the coil assemblies 16 is referred to as the shipping position. Here the coil assemblies 16 are suspended by the outboard tab 32 of the latch 17 which operates as a catch. There are two coil wires ends 18 for each coil assembly 16. One end 18 is visible in FIG. 2A and both of the ends 18 are visible in FIG. 1. Ends 18 are the termination ends of the main coil windings 24 projecting from the coil assembly 16 and are located just below the surface of the carrier funnels 14 when the unit is oriented in the shipping position. The typical coil wire, including the ends 18, is 28 or 30 gauge. When the terminal ends are cut, they undergo a coining operation to remove any burrs on the cut ends. The ends are also preferably tin or solder plated in preparation for future assembly operations.

Figure 2B:
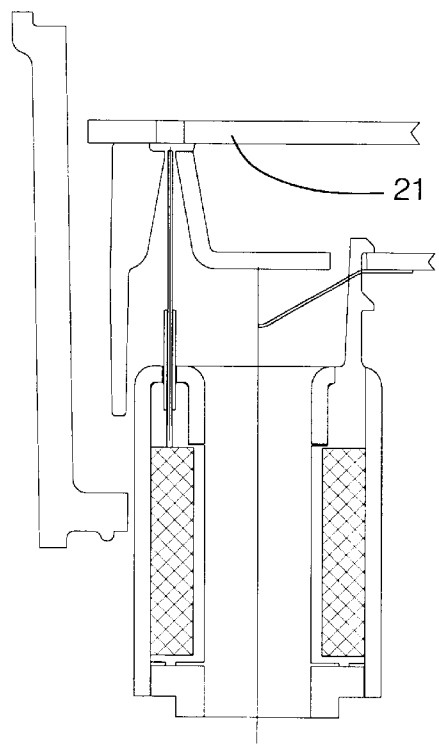
FIG. 2B is a schematic fragmentary cross sectional illustration of a single solenoid coil of the coil pack assembly of FIG. 1 shown in a shipping position with an installed circuit board.

In FIG. 2B, the circuit board 21 is located on top of the carrier by two pins 12 and is snapped onto the carrier 11 and is held in location by the four tabs 13 that are located around the edges of the carrier 11. A skirt 15 is provided on the carrier 11 to assist in initially locating the coils. The shipping position of the coil assemblies 16 within the coil pack 10 allows preassembly with the carrier 11 for unitary transport to the location of the process that effects marriage of the coil pack 10 with the control circuit board 21.

Figure 2C:
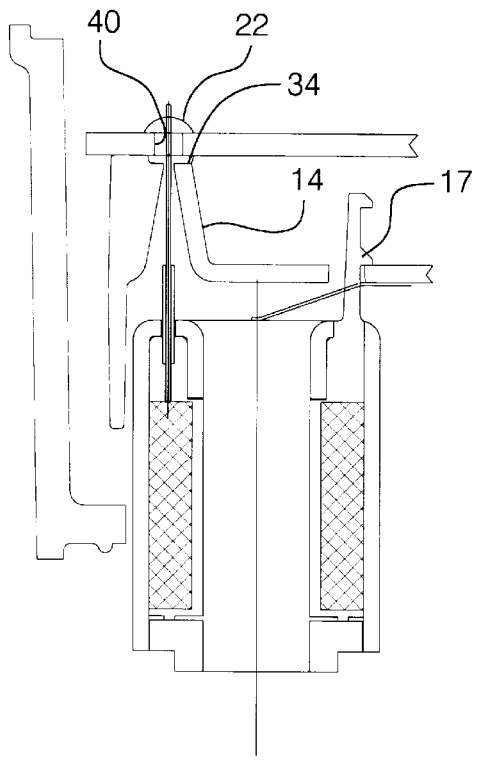
FIG. 2C is a schematic fragmentary cross sectional illustration of a single solenoid coil of the coil pack assembly of FIG. 1 shown in a solder position.

The coil assemblies 16 are placed into the solder position shown in FIG. 2C by being moved relative to the carrier 11 and toward the circuit board 21 by applying a force (either manually or through automatic assembly equipment), to the coil assemblies 16. At this point the spring 19, which is carried by or formed as part of the carrier 11, pre-engages the ends of coil cases 23 to provide a sufficient biasing force so that the inboard tabs 33 operate as catches to hold the coil assemblies 16 in position. While the coil assemblies 16 are being moved into the solder position, the small discharge end of the wire guide funnels 14 at the face 34 assures that the fragile coil wires 18 are always sufficiently in line with the relevant solder holes 40 on the circuit board 21 so that no binding will be sustained. To ensure wire alignment the discharge openings in the funnels 14 are significantly smaller than the solder holes 40 in the circuit board. In the prior art, separate terminals are employed at the ends of the coil wire 18 (either soldered or wrapped) to give additional rigidity to the termination. Use of such terminals is avoided in this embodiment of the present invention.

Figure 2D:
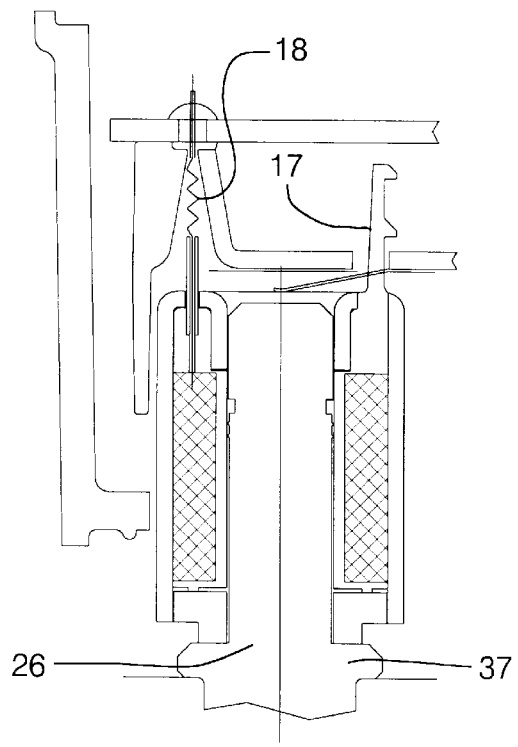
FIG. 2D is a schematic fragmentary cross sectional illustration of a single solenoid coil of the coil pack assembly of FIG. 1 shown in an installed position.
Figure 4:
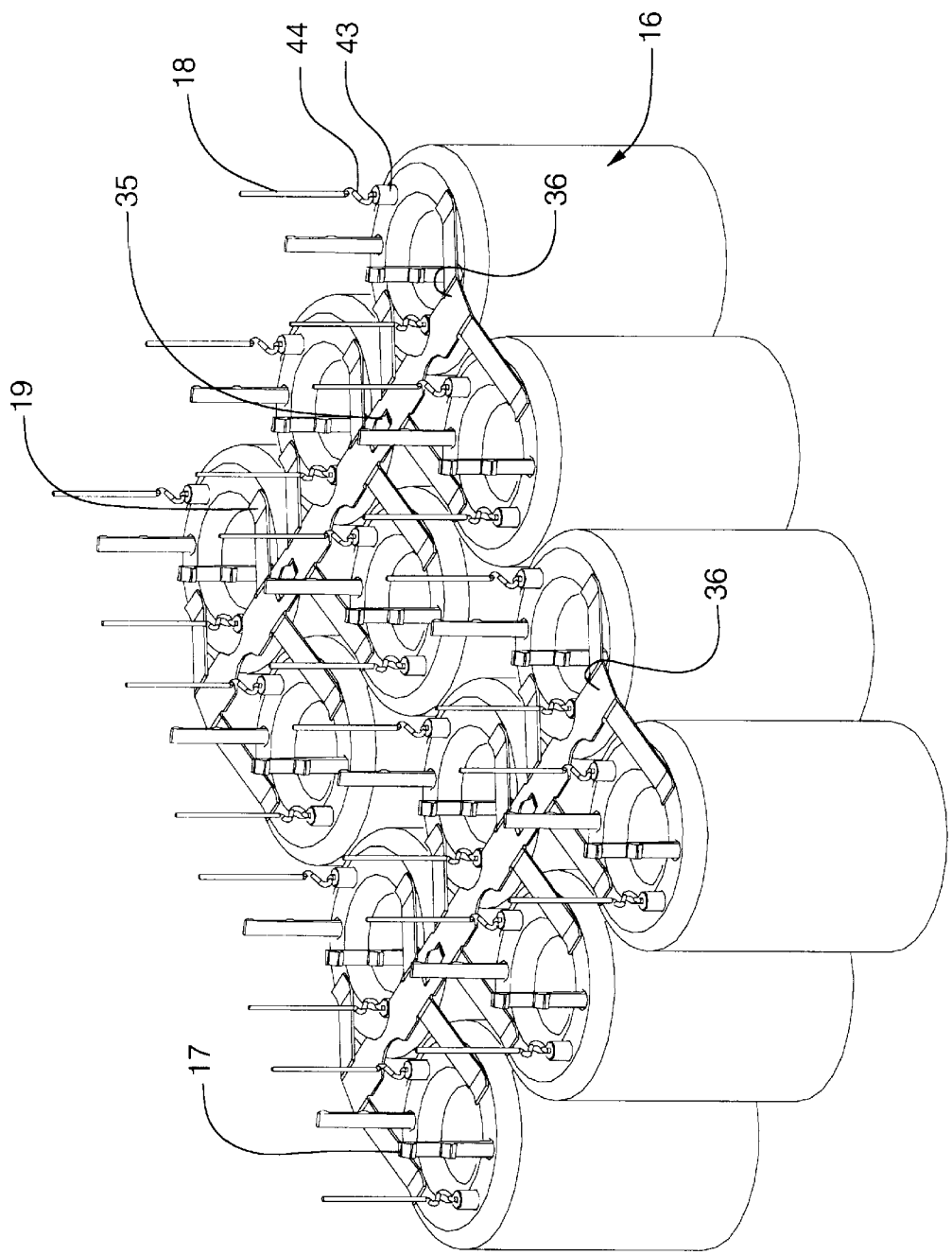
FIG. 4 is a detail perspective view of the molded coil carrier of the coil pack assembly of FIG. 1 with additional optional features.

Even though the coil wires are quite small in diameter, with the present invention, by leading the ends 18 into the large end of the wire guide funnels 14 with smooth, gradually sloping sides toward a relatively small discharge opening, the system locates the ends 18 accurately with respect to the circuit board 21. This provides for an efficient manufacturing process and allows for the total elimination of the separate terminal pieces themselves. An insulator 20 is used on a portion of the wire to isolate the wire from the case 23 of coil assembly 16 and from the springs 19. Optionally, as shown in FIG. 4, bosses 43 can be molded directly on the top surface of spool, that are sufficiently high so that the wires cannot touch either the case 23 or spring 19 as it is being installed. Once the coil assemblies 16 are located in the solder position, the wire ends 18 project a sufficient amount through the circuit board 21 so that conventional processing techniques such as wave soldering may be employed to connect the ends 18 to the appropriate circuit. When the coil assembly 16 is mated with the corresponding hydraulic modulator valve 26, as shown in FIG. 2D, the coil assemblies 16 are moved toward the circuit board 21 and the wire ends 18 are partially buckled within the funnels 14 to allow slack for coil movement as alignment occurs with the mating valve assemblies. This provides for the part-to-part variation of valve spacing due to normal manufacturing tolerances. Additional compliance may be added to the wire ends 18 by preforming an optional coil 44 as shown in FIG. 4. When the coil assemblies 16 are mated with the valves 26, the inboard tabs 33 separate from the wall 31 and the valves hold the coil assemblies in alignment. The valve 26 is of the type disclosed in U.S. Pat. No. 5,845,672 which is commonly assigned and is specifically incorporated herein by reference. The use of the present concept, with the coil assemblies 16 pre-assembled into a separate carrier 11 before assembly to the circuit board 21 simplifies the final coil-to-circuit board assembly process.

Figure 3:
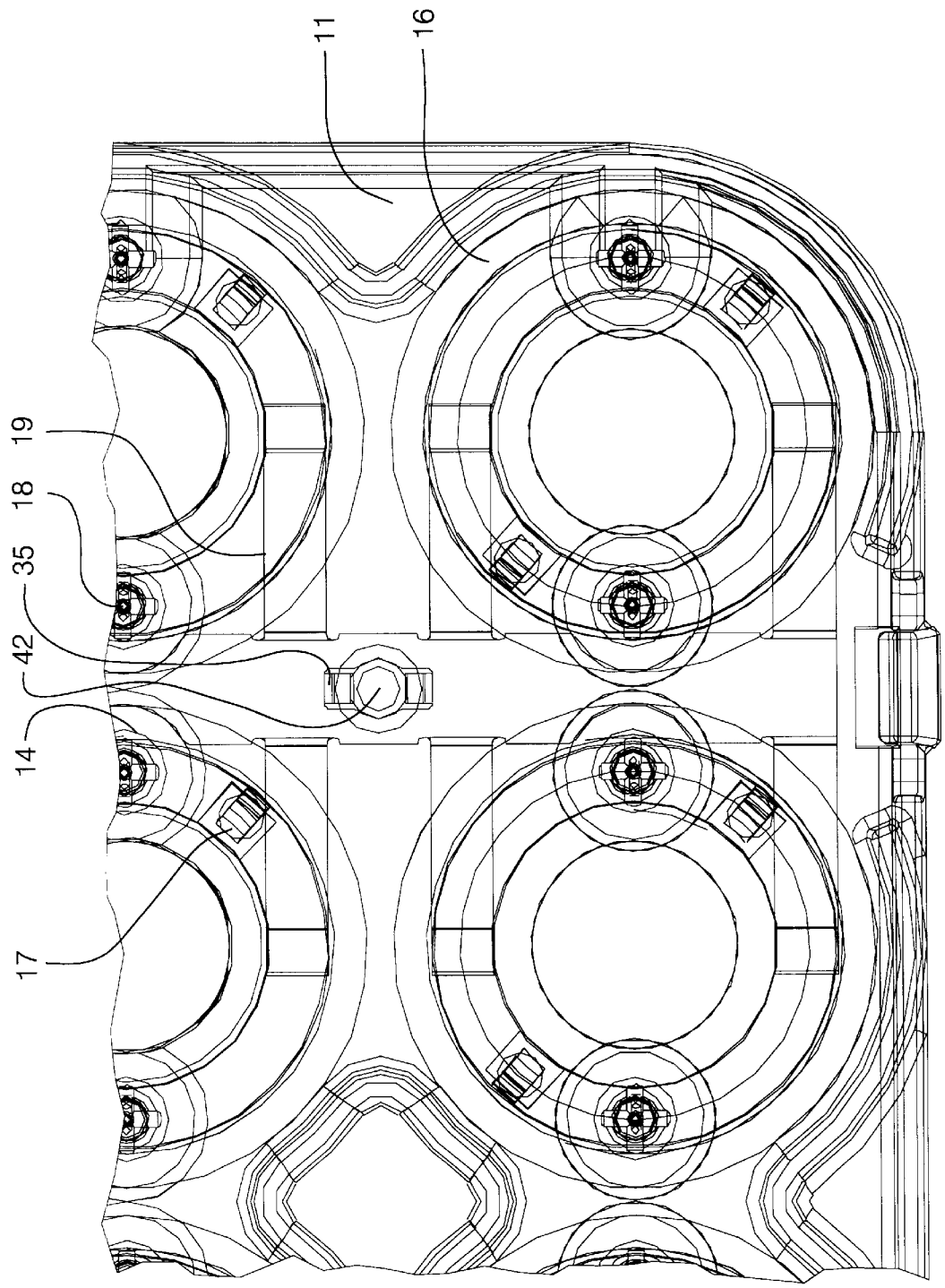
FIG. 3 is a detail partial plan view of the coil pack assembly of FIG. 1.

FIG. 4 shows the molded plastic coil carrier 11 removed to reveal the details and the location of the finger springs 19. Springs 19 are first attached to the coil carrier 11 by pressing the four openings 35 of the springs over corresponding projections 42 on the carrier 11 as shown in FIG. 3. The springs 19 are formed as two separate components. Each of the separate spring assemblies 36 includes a main body with twelve branches, two of which engage each coil assembly 16. These springs provide multiple functions. First, they are used to keep the coils 16 locked against the tabs 17 when the assembly is in the solder position. Thus, the carrier 11 may be fully turned over and the coil wire ends 18 are held in the correct position for wave soldering 22. Second, the springs serve to push the coils 16 against the base 37 of the valve 26 as shown in the installed position of FIG. 2D. The installed position refers to the state when the entire ECU assembly is mated with the hydraulic portion of the ICS. When the coil assembly 16 and valve 26 are mated, the magnetic coupling path is optimized since a close surface contact is assured directly between the coil case 23 and the valve body flange 37.

Third, the springs also serve to stabilize the valve coil assemblies 16 from any typical underhood vibration effects which may be experienced in normal driving conditions. In particular, the installed spring force is sufficiently high so that the coils 16 are kept firmly in place even though vibrational forces operate in an attempt to separate the coil assemblies 16 from the valve body flanges 37. This minimizes any fatigue on the coil wire ends 18 and assures a constant magnetic coupling. This becomes important during an ABS stop when there may be high levels of underhood vibrations generated from a high coefficient surface, at the same time that consistent valve performance is required. Although multiple leaf-type springs are shown in this particular design, either single coil springs sufficiently sized to act on the top of each coil case 23 or multiple small coil springs contained in individual pockets in the carrier and acting on opposite sides of the top of the coils case 23 (neither concept shown) could be used to provide the same spring function as the multiple leaf spring.

Figure 5:
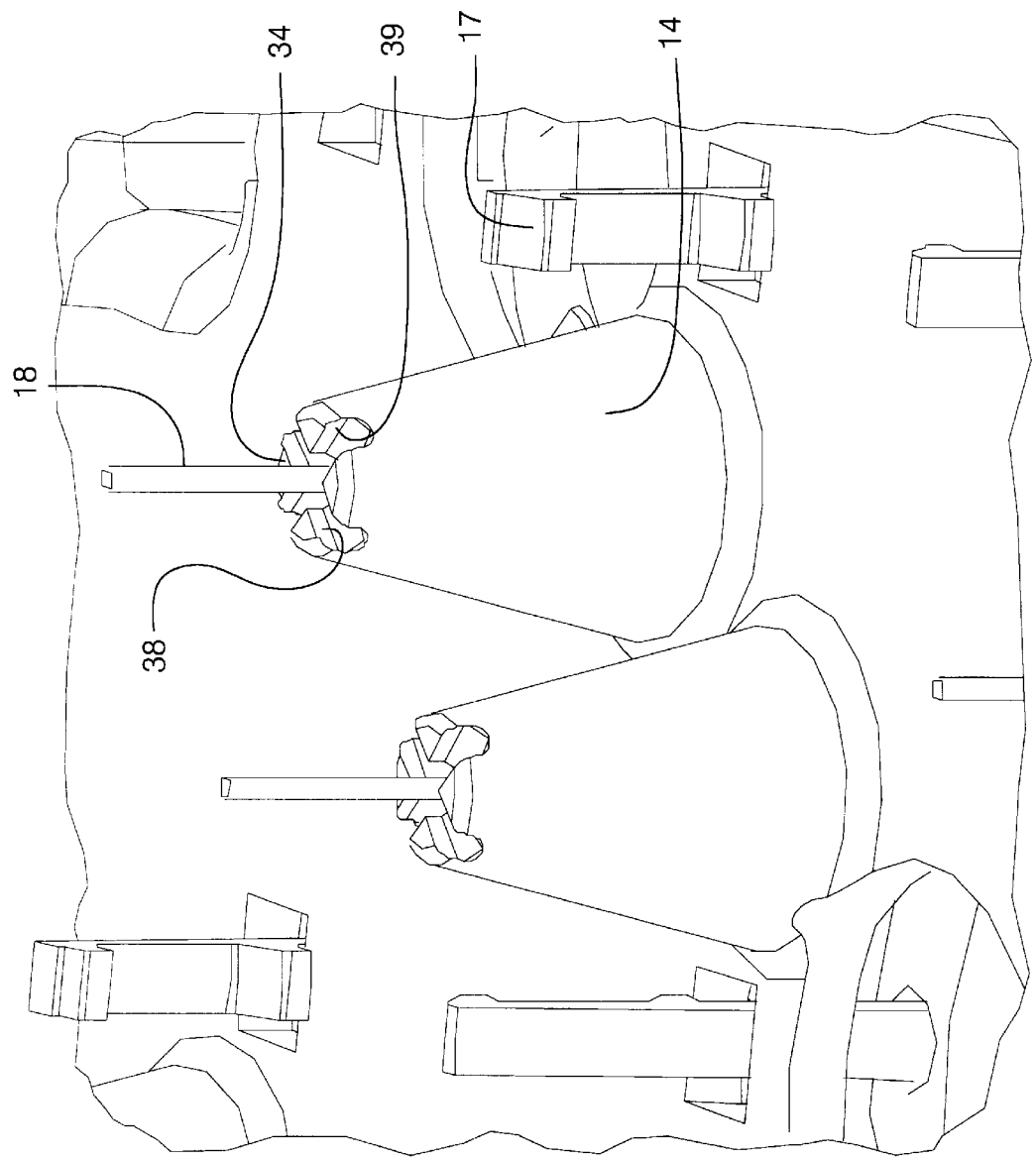
FIG. 5 is a detail partial perspective view of the coil pack assembly of FIG. 1.

FIG. 5 shows details of the funnel 14. The general shape is that of a truncated round conical section with openings at both ends so that the wire ends 18 may pass through. The terminal end of the funnel 14 away from the wall 31 has a face 34 that is used to rest directly on the circuit board 21 as shown in FIG. 2D. The soldering flow channels designated 38 and 39 are positioned in the face 34 and intersect at the opening in the face 34. This geometry, coupled with a sufficient size, allows solder to flow onto the back side of the circuit board solder holes 40 facilitating optimum solder joint quality.

In summary, the present invention utilizes a coil pack concept for pre-assembly of coil assemblies to a carrier minimizing the time and effort required to install the coils on the main circuit board assembly line. A low cost, all-plastic carrier with associated built-in features, pilot pins and clips is used for easy, precise circuit board mounting. Cone shaped wire guide funnels are used, and external guides in the carrier assembly make the installation of individual coils efficient for design for manufacture. A latch arrangement is built into the coil bobbin that has a double catch feature. The first catch provides a shipping position and the second catch provides a solder position. A series of springs act against each coil case to pre-load the coils against the bobbin latch(es), against the valve body flange for optimized consistent magnetic coupling, and against the valve body flange to eliminate any relative motion between the coil and valve body in order to alleviate concerns for fatigue of the coil attachment wires. Additionally, a solder well feature is used at the end of each wire guide funnel to promote good solder penetration to assure consistent product quality. Thus, the solenoid coil attachment mechanism of the present invention provides a robust and highly efficient means of attaching solenoid valve coils directly to an electronic controller circuit board.

We claim:

1. A solenoid coil attachment mechanism comprising:
   a coil assembly including a wire end that projects from the coil assembly and wherein the coil assembly includes an extending elongated leg that includes a latching mechanism; and
   a carrier having a wall with an opening receiving the leg of the coil assembly and having a wire guide that is funnel shaped, has an open end, and receives the end of the wire.

2. A solenoid coil attachment mechanism according to claim 1 further comprising a spring with an opening wherein the wall includes a projection that is received in the opening of the spring and wherein the spring biases the coil assembly away from the wall.

3. A solenoid coil attachment mechanism according to claim 1 wherein the leg has a first tab that catches the coil assembly in a first position relative to the carrier and wherein the leg has a second tab that catches the coil assembly in a second position that is closer to the carrier than the first position.

4. A solenoid coil attachment mechanism according to claim 3 wherein the first position places the end of the wire within the wire guide and the second position causes the end of the wire to project through the open end of the wire guide.

5. A solenoid coil attachment mechanism according to claim 4 further comprising a circuit board having a solder opening and attached to the carrier wherein the second position causes the end of the wire to project into the solder opening.

6. A solenoid coil attachment mechanism according to claim 5 wherein a slot is formed in the open end of the wire guide and adjacent the circuit board, wherein the slot forms a solder well that helps solder flow through the solder opening of the circuit board.

7. A solenoid coil attachment mechanism according to claim 1 wherein a plurality of coil assemblies are carried by the carrier.

8. A solenoid coil attachment mechanism according to claim 7 further comprising a circuit board attached to the carrier wherein the coil assemblies are attached to the carrier before the carrier is attached to the circuit board.

9. A solenoid coil attachment mechanism according to claim 8 further comprising a valve inserted in each coil assembly wherein the valves are inserted in the coil assemblies after the circuit board is attached to the carrier.

10. A solenoid coil attachment mechanism comprising:
    a coil assembly having a plurality of turns of wire wound on a bobbin wherein the wire has an end that projects from the bobbin and wherein the coil assembly includes an extending elongated leg that has a first tab and a second tab; and
    a carrier having a wall with an opening receiving the leg of the coil assembly and having a wire guide that is funnel shaped, and has a first large open end and a second small open end, wherein the wire guide receives the end of the wire through the large open end.

11. A solenoid coil attachment mechanism according to claim 10 further comprising a spring with an opening wherein the wall includes a projection that is received in the opening of the spring and wherein the spring biases the coil assembly away from the wall.

12. A solenoid coil attachment mechanism according to claim 10 wherein the first tab catches the coil assembly in a first position relative to the carrier and wherein the second tab catches the coil assembly in a second position that is closer to the carrier than the first position.

13. A solenoid coil attachment mechanism according to claim 12 wherein the first position places the end of the wire within the wire guide and the second position causes the end of the wire to project through the second small open end of the wire guide.

14. A solenoid coil attachment mechanism according to claim 13 further comprising a circuit board having a solder opening and attached to the carrier wherein the second position causes the end of the wire to project into the solder opening.

15. A solenoid coil attachment mechanism according to claim 14 wherein a slot is formed in the small open end of the wire guide and adjacent the circuit board wherein the slot forms a solder well that helps solder flow through the solder opening of the circuit board.

16. A solenoid coil attachment mechanism according to claim 10 wherein a plurality of coil assemblies are carried by the carrier.

17. A solenoid coil attachment mechanism according to claim 16 further comprising a circuit board attached to the carrier wherein the coil assemblies are attached to the carrier before the carrier is attached to the circuit board.

18. A solenoid coil attachment mechanism according to claim 17 further comprising a valve inserted in each coil assembly wherein the valves are inserted in the coil assemblies after the circuit board is attached to the carrier.

19. A solenoid coil attachment mechanism according to claim 18 wherein each coil assembly has two legs with the tabs of each leg being directed away from the other leg and wherein the legs are flexible to hold the respective coil assembly in position when extending through the wall.

20. A solenoid coil attachment mechanism comprising:
    a carrier having a wall with a plurality of latch openings and having a plurality of wire guides that are funnel shaped and each wire guide has a first large open end and a second small open discharge end;
    a circuit board attached to the carrier and having a plurality of solder openings; and
    a plurality of coil assemblies each having a plurality of turns of wire wound on a bobbin wherein each wire has a terminal end that projects from the bobbin and is coined so that when the terminal end is inserted into the corresponding wire guide from the first large open end it is freely guided to the second end having a small discharge opening wherein the discharge opening is smaller than the solder opening, and wherein each coil assembly includes an extending elongated leg that has a first tab and a second tab, wherein the first tab is engageable with the wall of the carrier to hold each coil assembly in a first position where the terminal end is inside the wire guide and wherein the second tab is engageable with the wall to hold the coil assembly in a second position closer to the circuit board than the first position where the terminal end extends from the discharge opening and into the solder opening.

* * * * *